United States Patent [19]
Caprara

[11] Patent Number: 6,115,402
[45] Date of Patent: Sep. 5, 2000

[54] SOLID-STATE LASER HAVING RESONATOR CONFIGURED FOR COMPENSATING FOR THERMAL LENSING

[75] Inventor: Andrea Caprara, Menlo Park, Calif.

[73] Assignee: Coherent, Inc., Santa Clara, Calif.

[21] Appl. No.: 09/040,559

[22] Filed: Mar. 18, 1998

Related U.S. Application Data

[63] Continuation-in-part of application No. 08/924,176, Sep. 5, 1997, Pat. No. 5,912,912.

[51] Int. Cl.$^7$ ...................................................... H01S 3/081
[52] U.S. Cl. ............................................... 372/101; 372/93
[58] Field of Search ................................. 372/34, 94, 92, 372/107, 101, 93

[56] References Cited

U.S. PATENT DOCUMENTS

| | | | |
|---|---|---|---|
| 4,885,752 | 12/1989 | Chien et al. | 372/33 |
| 5,001,718 | 3/1991 | Burrows et al. | 372/33 |
| 5,243,615 | 9/1993 | Ortiz et al. | 372/34 |
| 5,272,713 | 12/1993 | Sobey et al. | 372/69 |
| 5,699,376 | 12/1997 | Richmond | 372/68 |
| 5,757,842 | 5/1998 | LaPlante et al. | 372/92 |

FOREIGN PATENT DOCUMENTS

| | | | |
|---|---|---|---|
| 0 400 830 | 5/1990 | European Pat. Off. | H01S 3/00 |
| 2 663 793 | 6/1990 | France | H01S 3/10 |
| 59-195892 | 11/1984 | Japan | H01S 3/05 |
| WO 97/07575 | 2/1997 | WIPO | H01S 3/0941 |

OTHER PUBLICATIONS

PCT International Application No. PCT/US98/16722, "Invitation to Pay Additional Fees," mailed Jan. 21, 1999, containing a "Partial International Search," 4 pages in length.

"Notification of Transmittal of The International Search Report or the Declaration," in PCT Application No. PCT/US98/16722, mailed Apr. 16, 1999, 9 pages in length.

Li Yan & Lei Ding, "Intracavity injection lasing in a hybrid neodymium laser," *Applied Physics Letters*, vol. 67, No. 25, Dec. 18, 1995, pp. 3679–3681.

Wei–Lou Cao, Chi H. Lee, Li Yan & Michael Wraback, "A Diode–Pumped Hybrid Nd:Phosphate Glass and Nd:YVO$_4$ Laser," *Technical Digest* (12th Topical Meeting), Jan. 27–29, 1997, 5 pages in lenth (TuC2–171 through TuC2–173).

G.V. Vdovin & S.A. Chetkin, "Active correction of thermal lensing in solid–state lasers. II. Use of a resonator with a controllable configuration," *Quantum Electronics*, 23 (2), Feb. 1993, pp. 141–145.

N. Pavel, T. Dascalu & V. Lupei, "Two rods VRM–unstable resonator versus single rod unstable resonator with amplifier stage," *Proceedings (SPIE—The International Society for Optical Engineering)*, a Laser Optics '95 conference on Solid State Lasers, Jun. 27–Jul. 1, 1995, vol. 2772, pp. 200–208.

N. Pavel, T. Dascalu, V. Lupei, "Variable reflectivity mirror unstable resonator with deformable mirror thermal compensation," *Optics Communications*, vol. 123, Jan. 15, 1996, pp. 115–120.

S.A. Chetkin, G.V. Vdovin & K. Ueda, "Intracavity Adaptive Optics for a Powerful Nd:YAG Laser," *Laser Physics*, vol. 5, No. 6, 1995, pp. 1189–1198. (No month).

*Primary Examiner*—James W. Davie
*Attorney, Agent, or Firm*—Limbach & Limbach L.L.P.

[57] ABSTRACT

A laser resonator including a gain medium with strong thermal-lensing properties includes an arrangement for providing near real-time compensation for variations in the thermal-lensing effects in the gain-medium resulting from variations in resonator operating parameters.

35 Claims, 14 Drawing Sheets

SOLID-STATE LASER HAVING RESONATOR CONFIGURED FOR COMPENSATING FOR THERMAL LENSING

CROSS REFERENCE TO PRIOR APPLICATIONS

This application is a Continuation-in-Part of application Ser. No. 08/924,176, filed Sep. 5, 1997 and now U.S. Pat. No. 5,912,912, issued Jun. 15, 1999.

TECHNICAL FIELD OF THE INVENTION

The present invention is related in general to repetitively-pulsed solid-state lasers. It is related in particular to a solid state-laser including active compensation for thermal-lensing effects in a gain-medium or other components of a resonant cavity.

DISCUSSION OF BACKGROUND ART

A preferred prior-art laser resonator type for providing a stream of laser-radiation pulses for several laser applications is a continuously-pumped, repetitively-pulsed, Q-switched, resonator. In a particularly preferred such prior-art resonator type, continuous pumping is typically provided by a plurality of laser-diodes, to a solid-state gain-medium such as Nd:YAG, Nd:YVO$_4$, Nd:YLF or the like. Resonators including these gain-media provide fundamental laser-radiation at infrared (IR) wavelengths which, according to a particular application, can be conveniently converted to radiation at shorter-wavelengths by one or more frequency doubling or mixing steps in optically non-linear media (crystals). Such a resonator type can be efficient and compact, for example with resonator length of about 0.5 meters (m), or less. The resonator can be folded to reduce its overall physical dimension or to facilitate pumping.

Above described general advantages in efficiency, size, and wavelength-flexibility notwithstanding, any one prior-art, repetitively-pulsed laser resonator arrangement is limited in the range of pulse-parameters or pulse repetition frequencies (pulse-frequencies) which can be efficiently delivered. These ranges are determined by characteristic properties of a particular gain-medium, in particular excited state lifetime ($\tau$) and gain cross-section ($\sigma$). Should a potential laser application demand pulsed laser-radiation having pulse and frequency parameters which can not be efficiently provided by a known gain-medium, then the application can at best be inefficiently satisfied.

For any particular pulse-parameter or frequency range, the range of efficient power-output available may be limited by thermal-lensing in whatever gain-medium is selected. Thermal-lensing is refractive power induced in the gain-medium due to refractive-index change with temperature increase resulting from absorbed pump-power. Thermal-lensing can vary significantly with variations of absorbed power, and also with variations in pulse-frequency. While optical components of a resonator can be selected to compensate for a particular level thermal-lensing, the configuration is typically effective for only a limited range of pump-power and pulse-frequency.

There is a need for a laser resonator arrangement which overcomes above discussed limitations on laser performance imposed by gain-medium characteristics. Preferably such an arrangement should also include means for actively compensating for variations in thermal-lensing in a gain-medium.

SUMMARY OF THE INVENTION

The present invention is directed to a laser resonant cavity arrangement for compensating for variations in thermal-lensing effects in a gain-medium or any other optical component disposed in a resonant cavity. The invention is directed in particular to providing an arrangement wherein such compensation is provided actively in response to detecting variations in one or more parameters of a beam of laser-radiation generated by the resonator during operation thereof.

In one aspect, a laser in accordance with the present invention comprises first and second mirrors forming a laser resonant cavity. At least two optical components are located in the resonant cavity. At least a first of said first optical components contributes to thermal-lensing effects in the resonant cavity during operation thereof. The thermal-lensing effects varying with variations of one or more operating parameters of the resonant cavity. A second of the optical components has positive optical power and is spaced apart from the first mirror. Spacing between the second optical component and the first mirror is variable for compensating for the variations in thermal-lensing effects.

In another aspect of the present invention a laser in accordance with the present invention may include means for detecting the variations in thermal-lensing effects. Means cooperative with the thermal-lensing variation detecting means vary the spacing between the second optical element and the first mirror in accordance with detected variations in thermal-lensing effects to compensate therefor. This aspect of the present invention provides that essentially real time compensation for thermal-lensing effects is possible. This provides that maximum operating efficiency can be maintained while varying output parameters such as power or, in a repetitively pulsed laser, pulse repetition frequency.

In one preferred embodiment, a laser in accordance with the present comprises first and second mirrors forming a laser resonant cavity. At least one solid-state gain-medium is disposed in the resonant cavity. The solid-state gain-medium contributes to thermal-lensing effects in the resonant cavity during operation thereof. The thermal-lensing effects vary with variations of one or more operating parameters of said resonant cavity.

A lens having positive dioptric power is disposed in the resonant cavity and spaced apart from said first mirror. The lens is in a fixed position and the first mirror is variable in position for varying spacing therebetween.

An arrangement is provided for detecting said spot-size variations of a beam of laser radiation generated in the resonant cavity during operation thereof and interpreting the spot-size variations as variations in thermal-lensing effects and for varying the spacing between the lens and the first mirror for compensating for the variations in thermal-lensing effects.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the invention.

DETAILED DESCRIPTION OF THE INVENTION

Figure 1:
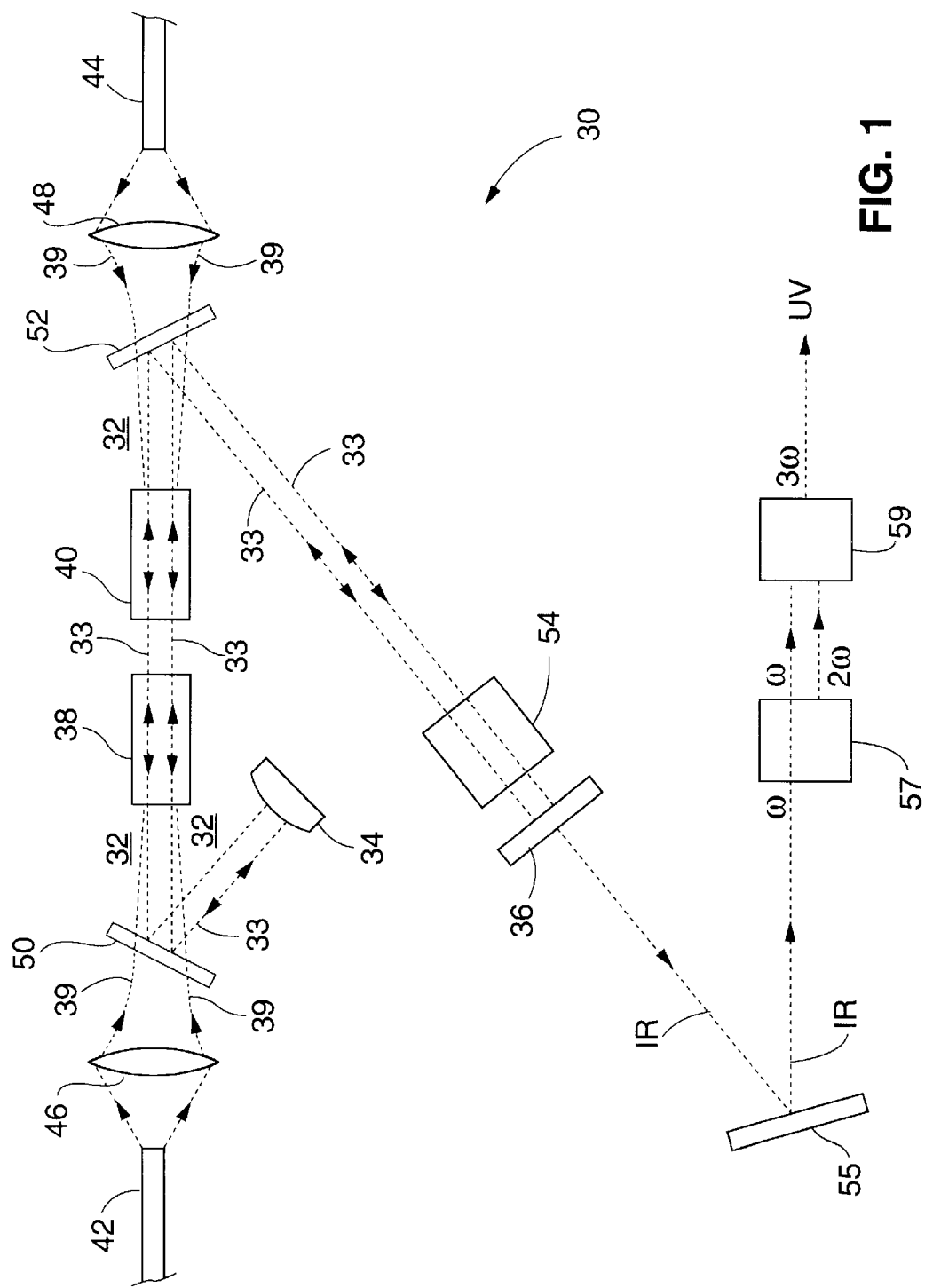
FIG. 1 schematically illustrates one preferred embodiment of a repetitively-pulsed Q-switched laser system in accordance with the present invention, having a resonant cavity including two different gain-media.

Turning now to the drawings, wherein like components are designated by like reference numerals, FIG. 1 depicts one preferred embodiment of a continuously-pumped, repetitively-pulsed, Q-switched laser system 30 in accordance with the present invention. Laser system 30 includes a three-arm or X-folded resonator 32 formed between mirrors 34 and 36. Laser-radiation circulates within the resonator as indicated schematically by rays 33. Mirror 36 is partially transparent and functions as an output coupling mirror of resonator 32. Located in resonator 32 are first and second gain-media 38 and 40 respectively. Gain media 38 and 40 are optical components in the form of rods or crystals and are referred to hereinafter simply as rods. Rods 38 and 40 are formed from different materials having different characteristic (excited-state) lifetimes or different gain cross-sections, but which lase at about the same wavelength.

During operation of laser system 30, pump radiation 39 is provided continuously by first and second diode-laser arrays or bars (not shown), the collective output of which is directed by optical-fibers or fiber bundles 42 and 44 and focussing lenses 46 and 48 respectively, via resonator fold-mirrors 50 and 52, to rods 38 and 40 respectively. Fold mirrors 50 and 52, of course, are dichroic mirrors including a coating which reflects laser-radiation 33 and transmits pump light 39. A radio-frequency (RF) driven acousto-optic Q-switch 54 is located in resonator 32 proximate output coupling mirror 36. While RF power is applied to Q-switch 54, lasing in resonator 32 is inhibited. Repetitively turning RF power on and off at a particular frequency causes resonator 32 to generate laser pulses at the same (pulse) frequency. A fold-mirror 55 directs output IR radiation (at fundamental radiation frequency ω) to a first non-linear crystal for frequency doubling (ω to 2ω). The doubled frequency is then mixed with the fundamental frequency in a second non-linear crystal 59 to provide frequency-tripled radiation (3ω).

In a preferred example of resonator 30, mirror 36 is a plane mirror and mirror 34 is a convex mirror having a radius of curvature of about 20.0 cm. Rod 40 is a 0.6%-doped Nd:YVO$_4$ rod having about 3.0 mm×3.0 mm cross-section and a length of about 7.0 mm. Rod 38 is a 1.0%-doped Nd:YAG rod having about 3.0 mm×3.0 mm cross-section and a length of about 10.0 mm. Mirror 34 is preferably placed as close as possible to rod 38, a distance of about 2.0 to 3.0 cm (of folded path) being sufficient to allow for placement of fold mirror 50. Overall resonator (folded path) length is about 22.0 cm. Non-linear crystals 57 and 59 are lithium borate (LBO) crystals.

The form and exemplified component specifications of resonator 32 should not be considered limiting. From a detailed description of principles of the present invention presented hereinbelow, those skilled in the art may devise a wide range of resonator configurations, folded or unfolded, using the same or different combinations of gain-media, either end-pumped or transversely-pumped, and differently Q-switched. Those skilled in the art will also recognize that applications of the present invention are not limited to those including frequency multiplication. Further, the present invention is not limited to deploying only two gain-media in a resonator. Three or more different media may be included, provided those media lase at about the same wavelength.

It is emphasized here that providing rods 38 and 40 of different gain materials to provide in effect a "hybrid gain-medium" should not be confused with prior-art polarization Q-switched resonator arrangements in which two rods of the same gain material have been provided to compensate for thermally-induced birefringence. In these prior-art arrangements, those resonator parameters which are limited by the gain-medium are essentially the same whether one or two rods are employed. The manner in which different gain-material characteristics can be combined in a supplementary manner in a two-rod resonator in accordance with the present invention is described below with reference to FIGS. 2–8.

Figure 2:
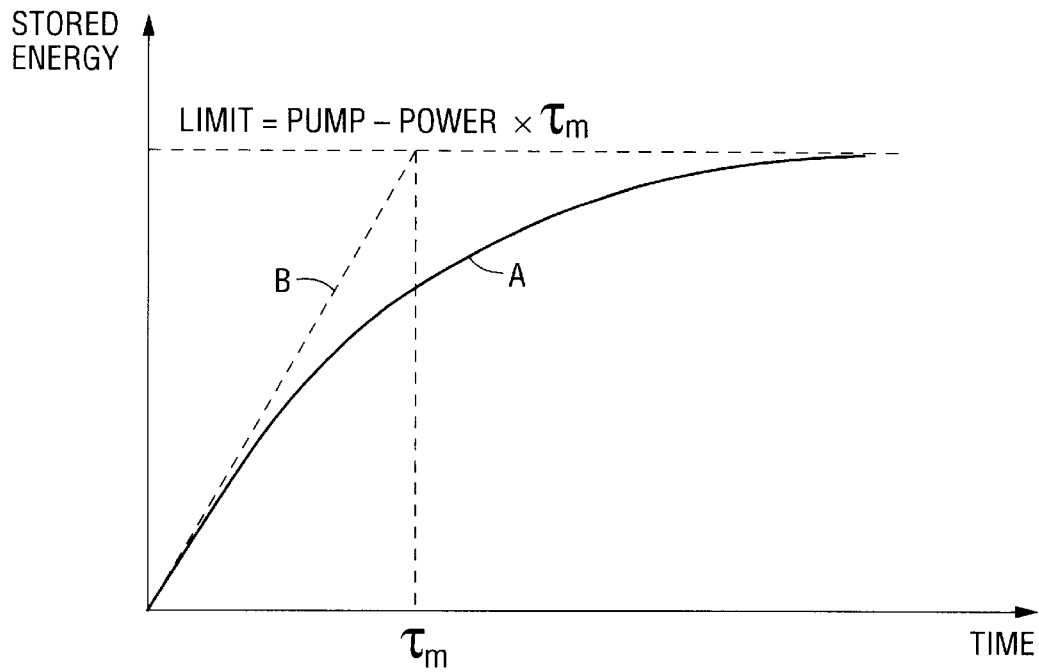
FIG. 2 is a graph schematically illustrating build-up of stored energy in a continuously pumped gain-medium with time following initiation of pumping.

Referring first to FIG. 2, curve A schematically illustrates build-up of stored energy in a continuously pumped arbitrary gain-medium or gain-material (m) with time. Stored energy builds up initially about linearly and relatively sharply with time, and then builds-up decreasingly sharply toward a limiting value which is the product of pump-power and characteristic lifetime $\tau_m$ of the material. $\tau_m$ corresponds approximately to the intersection of an extension (line B) of the linear portion of curve A with the limiting value of stored energy.

Figure 3:
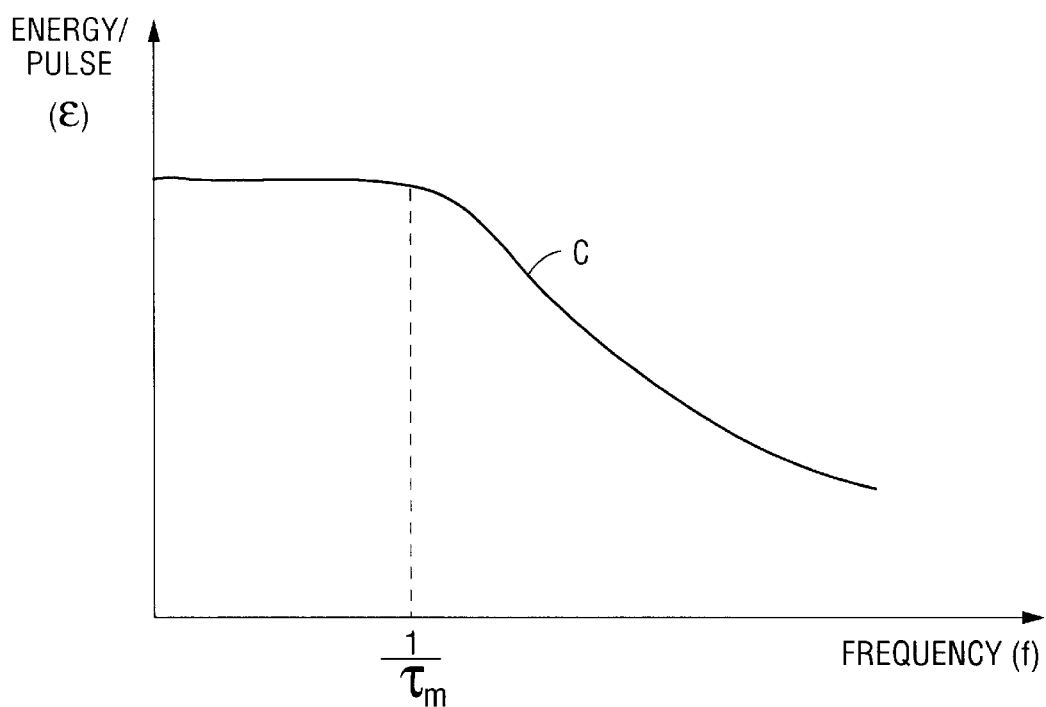
FIG. 3 is a graph schematically illustrating variation of energy-per-pulse with pulse-frequency in the gain-medium of FIG. 2.

Referring to FIG. 3, curve C schematically illustrates the variation of energy-per-pulse ($\epsilon$) as a function of pulse-frequency (f). This stays essentially constant up a to a frequency of about $1/\tau_m$ and decreases with pulse-frequency thereafter. Average output power, being the product of energy-per-pulse and pulse-frequency, will increase with pulse-frequency initially linearly through a pulse-frequency region 0 to $1/\tau_m$ (corresponding to the nearly constant portion of curve C) and then rise decreasingly with increasing pulse-frequency.

Figure 4:
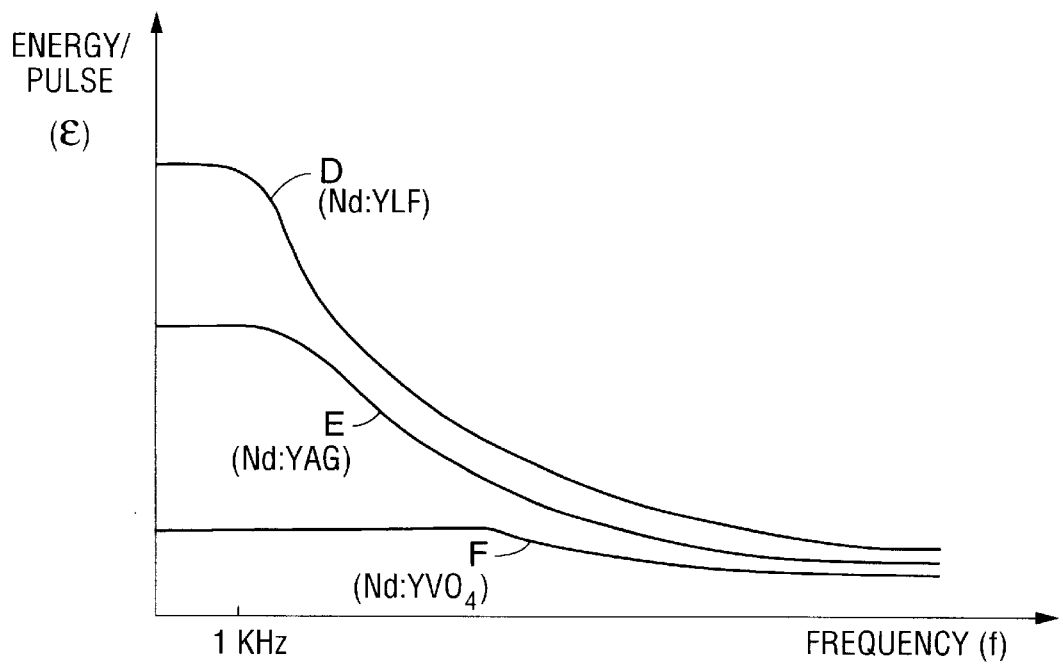
FIG. 4 is a graph schematically illustrating relative variation of energy-per-pulse with pulse-frequency for YLF, Nd:YAG and Nd:YVO$_4$.

Referring to FIG. 4, relative energy-per-pulse as a function of frequency is illustrated for Nd:YLF, (curve D) Nd:YAG (curve E) and Nd:YVO$_4$ (curve F). In the graph of FIG. 4 as in other comparative graphs discussed below, it is assumed that the materials are pumped at the same power in the essentially the same resonator configuration. Nd:YLF, Nd:YAG and Nd:YVO$_4$ have characteristic lifetimes of about 500, 230, and 90 microseconds ($\mu$s) respectively. Relative gain cross-sections for the three materials, in arbitrary units, are about 2, 3, and 15 respectively. Nd:YLF can provide the highest energy-per-pulse but this falls sharply with pulse-frequency beyond about 1 KHz. Nd:YVO$_4$ provides the lowest maximum energy-per-pulse, this can be maintained, however, up to a pulse-frequency of about 10.0 KHz, and falls only gradually with pulse-frequency thereafter. Nd:YAG has a energy-per-pulse versus pulse-frequency characteristic which is intermediate that of Nd:YLF and Nd:YVO$_4$.

Figure 5:
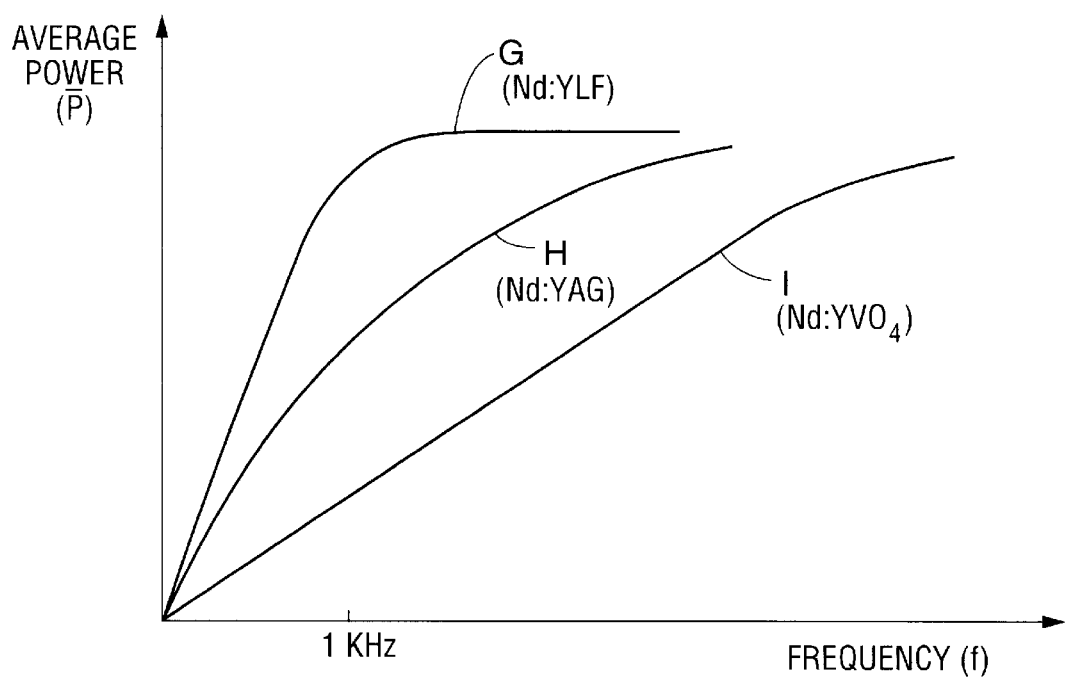
FIG. 5 is a graph schematically illustrating relative variation of average power with pulse-frequency for YLF, Nd:YAG and Nd:YVO$_4$.

From FIG. 5 it can be seen that Nd:YLF (curve G) can provide a nearly constant maximum average power at pulse-frequencies above 1 KHz, while Nd:YAG (curve H) and Nd:YVO$_4$ (curve I) rise to maximum average power at increasingly longer frequencies.

Figure 6:
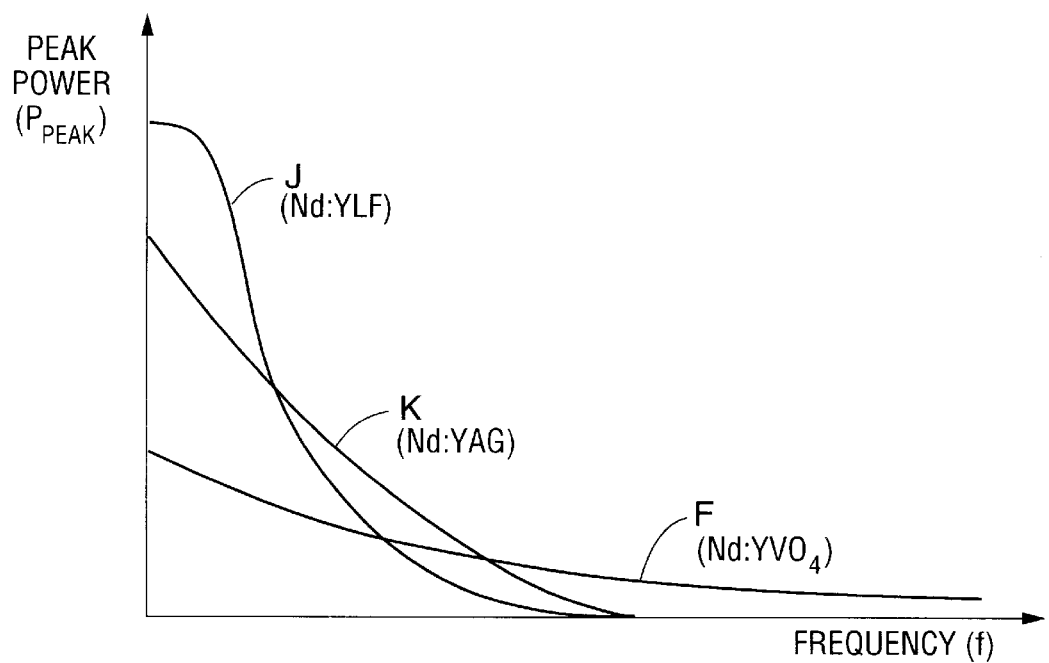
FIG. 6 is a graph schematically illustrating relative variation of peak power with pulse-frequency for YLF, Nd:YAG and Nd:YVO$_4$.

Referring to FIG. 6, it can be seen that regarding peak-power as a function of frequency, characteristics of Nd:YLF, Nd:YAG and Nd:YVO$_4$ compare in a similar manner to energy-per-pulse characteristics of FIG. 3, with Nd:YLF (curve J) providing the highest peak power and Nd:YAG (curve K) and Nd:YVO$_4$ (curve L) providing less peak power but with decreasingly sharper fall of peak power with frequency.

Which of the above discussed frequency-dependent characteristics is of particular importance depends on a particular application. In prior-art lasers this is a major consideration in selecting a particular gain-medium. It can be seen from the graphical representation of exemplary laser material characteristics, however, that characteristics of individual gain-materials can vary significantly, leaving significant gaps therebetween. Because of this, there may be applications for which no individual gain-material provides an ideal set of characteristics.

In a laser system in accordance with the present invention, by including two different gain-materials in a single resonator, particularly a resonator such as resonator 30 of FIG. 1 in which the gain-media can be individually and this selectively pumped, it is possible to generate laser-radiation having parameters which lie essentially anywhere between the parameters of laser-radiation generated by employing any of the gain-media alone. One example of "engineering" a laser system characteristic using the method of the present invention is set forth below. This example relates particularly to meeting laser-radiation requirements for machining printed circuit boards using UV-laser-radiation.

First it is instructive to consider those laser-radiation parameters which are important in generating UV-radiation from IR-radiation by frequency conversion in optically non-linear materials. In frequency doubling, the average power available at the doubled frequency (2$\omega$) is about equal to some constant times the product of the peak and average powers at the fundamental frequency ($\omega$). In a similar manner, the product of peak and average powers at the fundamental frequency also determines optimum conversion of the doubled frequency to the trebled frequency (3$\omega$) by mixing the fundamental and doubled frequencies.

Figure 7:
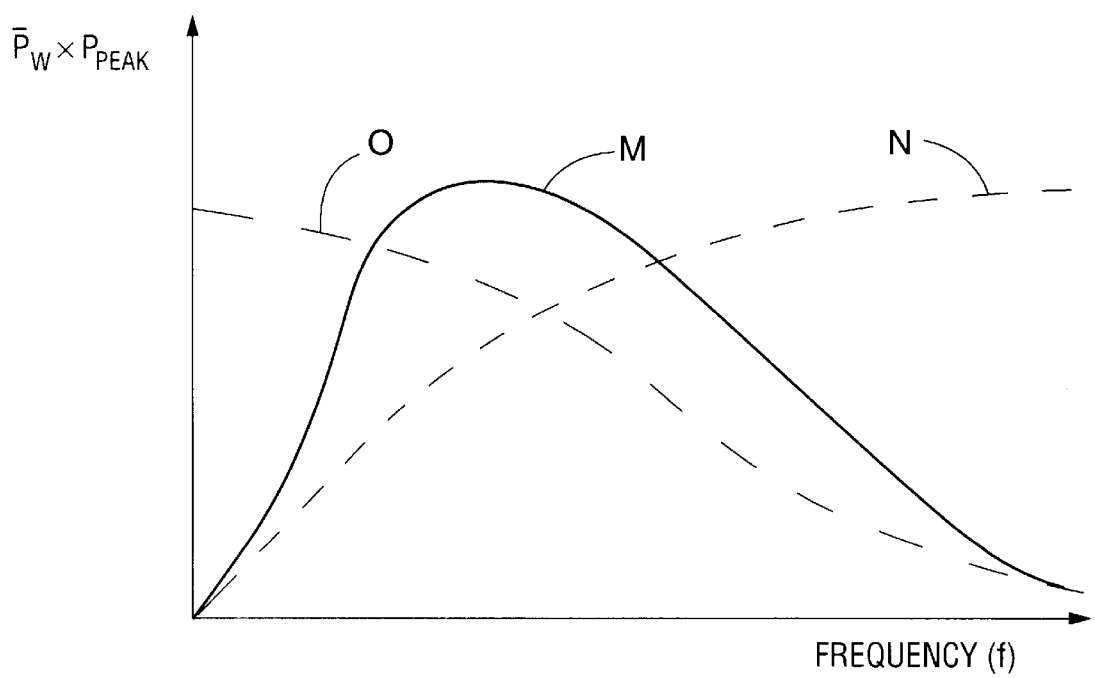
FIG. 7 is a graph schematically illustrating relative variation of peak power, average power, and the product of peak and average power with pulse-frequency for an arbitrary gain-material.
Figure 8:
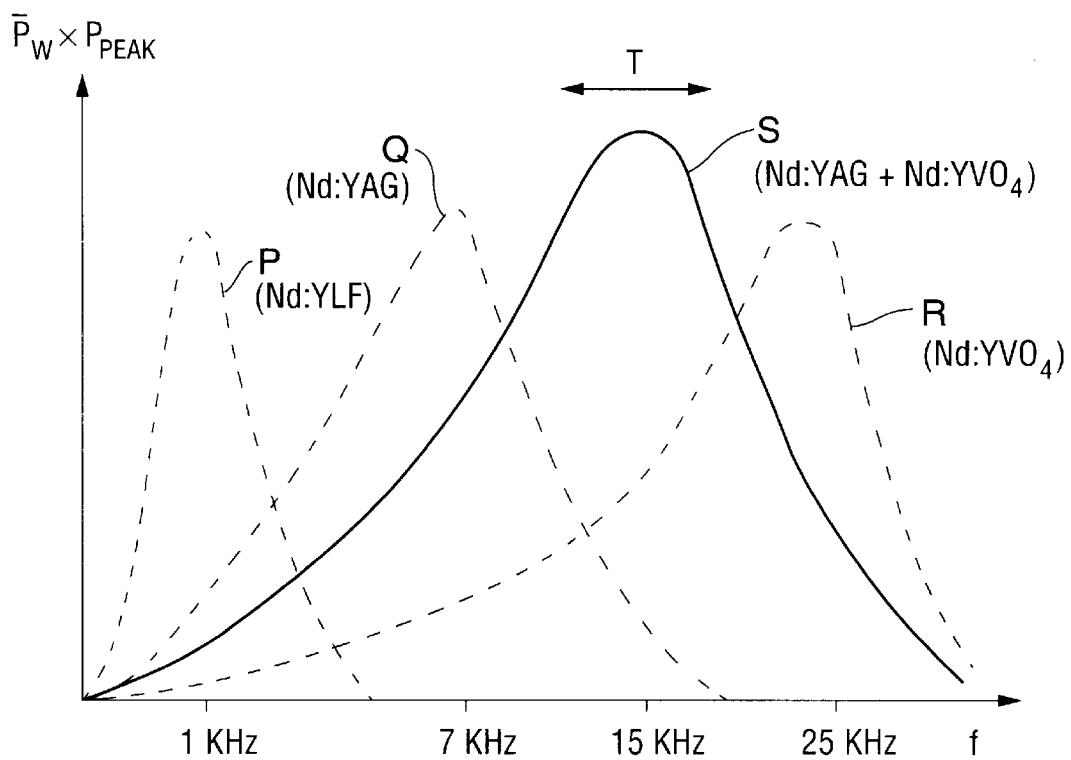
FIG. 8 is a graph schematically illustrating relative variation of the product of peak and average power with pulse-frequency for YLF, Nd:YAG and Nd:YVO$_4$, all compared with the variation of the product of peak and average power for a resonator including both Nd:YAG and Nd:YVO$_4$ gain-media.

Referring first to FIG. 7, the general form (curve M) of the product and peak and average power as a function of pulse-frequency is schematically illustrated. Corresponding average (dashed curve N) and peak (dashed curve O) functions, the general form of which is schematically illustrated in FIG. 5 and FIG. 6 respectively, illustrate why the peak-average power product rises from zero to a peak, and falls back to zero or near-zero. Referring next to FIG. 7, dashed curves P, Q and R schematically illustrate normalized peak-average power product as a function of pulse-frequency for Nd:YLF, Nd:YAG and Nd:YVO4 respectively. It can be seen that the curves are sharply peaked at pulse-frequencies of about 1 KHz, 7 KHz, and 25 KHz respectively, leaving significant voids therebetween.

While UV laser machining of printed circuit board materials such as copper, epoxy-resin and epoxy-impregnated fiberglass, may be performed at a pulse-frequency of 7 KHz at a wavelength of about 0.355 $\mu$m, it would be preferable to perform the machining at a higher pulse-frequency. However, while, as illustrated in FIG. 7, conversion efficiency of Nd:YVO$_4$ radiation peaks at a pulse-frequency of about 25 KHz, the energy-per-pulse available is near or below an ablation threshold for materials to be machined. This threshold must be exceeded in order to perform the machining.

By including both Nd:YAG and Nd:YVO$_4$ gain-media in a resonator 30 it has been found possible to generate 1.064 μm fundamental laser-radiation having a peak-average power product (frequency-conversion peak efficiency) which peaks at a pulse-frequency between that for the individual gain materials. It has also been found that by varying the ratio of pump-powers delivered by fibers 42 and 44 to the different gain-media, the frequency-conversion efficiency peak can be moved to higher or lower pulse-frequencies depending on whether the Nd:YVO$_4$ or Nd:YAG gain-medium is pumped at the higher power. Surprisingly, it has further been observed that, at least at a frequency of about 15 KHz, higher peak conversion efficiency is obtained with rods of the two different gain-media than would be obtained with two rods of the same gain-medium. In one example, pumping Nd:YAG and Nd:YVO$_4$ gain-media with about 10 Watts each provide an average power of about 2.5 Watts at 355 nm of about 15 KHz. The 15 KHz frequency has been found ideal for laser machining with 0.355 μm radiation.

From the description presented above, it can be seen by deploying different gain-media in what may be termed a "hybrid" laser resonator, the resonator output parameters need no longer be limited by the characteristics of a particular gain-medium. Varying pump-power delivered to the different gain-media provides a means for varying the "hybrid" resonator output parameters. However, all gain-media exhibit some degree of thermal-lensing, which varies to some degree with pump-power and pulse-frequency. In prior-art resonators, thermal-lensing is fixedly compensated by anticipating the dioptric power due to thermal-lensing and selecting appropriate optical parameters of the resonator mirrors, or providing curved entrance or exit surfaces (ends) on the gain-medium (rod). Accordingly, prior-art resonators can only operate with optimum beam quality at fixed, or at best marginally variable, pump-power and hence output-power.

In order to take maximum advantage of principles of the present invention, it is preferable to provide resonator for which output parameters including power and pulse-frequency are essentially infinitely and separately variable (between limits imposed by the different gain-media) at an essentially constant beam quality. In this regard, it would be advantageous to provide a means for actively compensating for variation of thermal-lensing effects in gain-media. A description of one such means, and the principles from which it is devised is set forth below.

Figure 9:
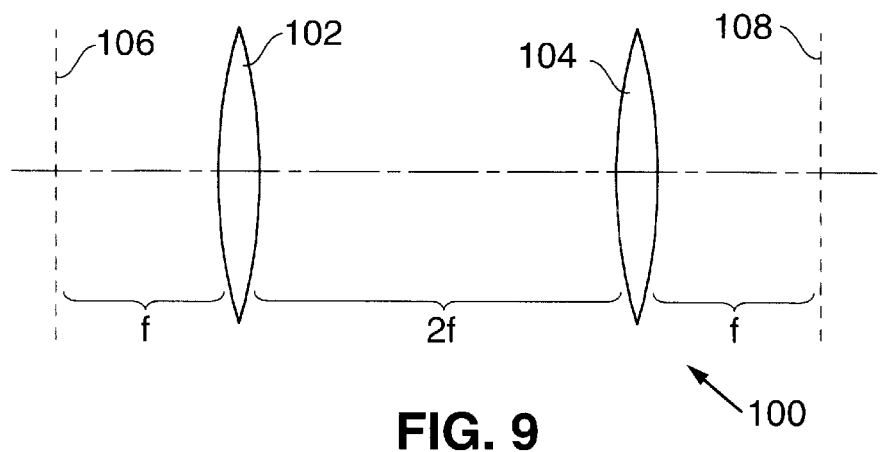
FIG. 9 schematically illustrates one hypothetical system of two spaced-apart spherical lenses from which system are derived active means in accordance with the present invention for compensating for variations of thermal-lensing in gain-media.

FIG. 9 illustrates a hypothetical symmetrical system 100 of two spherical lenses 102 and 104, each thereof having a focal length f and being separated by a distance 2f. An input plane 106 is at a distance f from lens 102. An output plane 108 is located at a distance f from lens 104.

The ABCD matrix for system 100 from plane 106 to plane 108 is, simply:

$$\begin{bmatrix} -1 & 0 \\ 0 & -1 \end{bmatrix} \quad (1)$$

Figure 10:
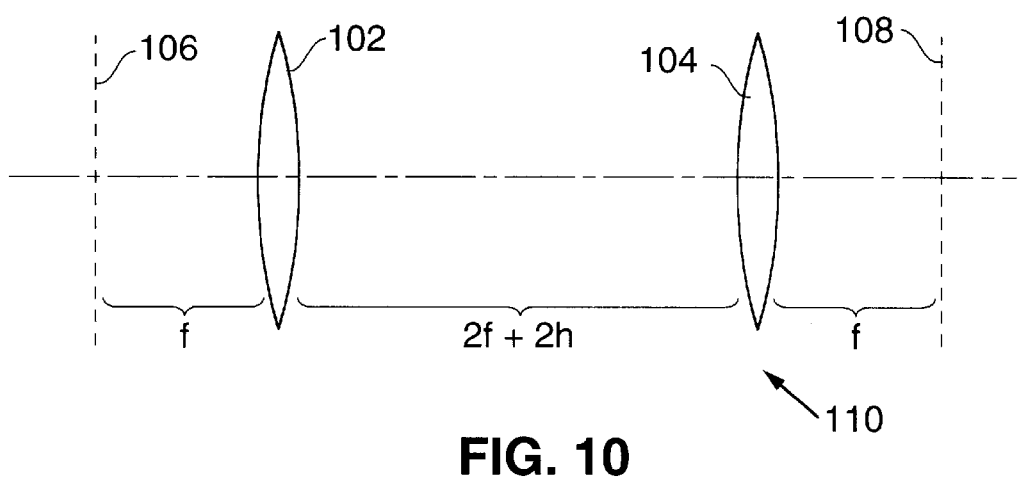
FIG. 10 schematically illustrates another hypothetical system of two spaced apart spherical lenses which system is a modification of the system of FIG. 9.

For a system 110 illustrated in FIG. 10, however, wherein the distance separating lenses 102 and 104 is equal to 2f plus some arbitrary distance 2h, the ABCD matrix is:

$$\begin{bmatrix} -1 & 0 \\ \frac{2h}{f^2} & -1 \end{bmatrix} = -1 \begin{bmatrix} 1 & 0 \\ -\left(\frac{2h}{f^2}\right) & 1 \end{bmatrix} \quad (2)$$

System 110 is thus equivalent, apart from an inversion which is of no consequence in determining a resonator mode, to a simple lens having a variable dioptric power $2h/f^2$ i.e., a dioptric power proportional to the lens-separation variable h. Variable h can be positive or negative, with the dioptric power being accordingly positive or negative.

Figure 11:
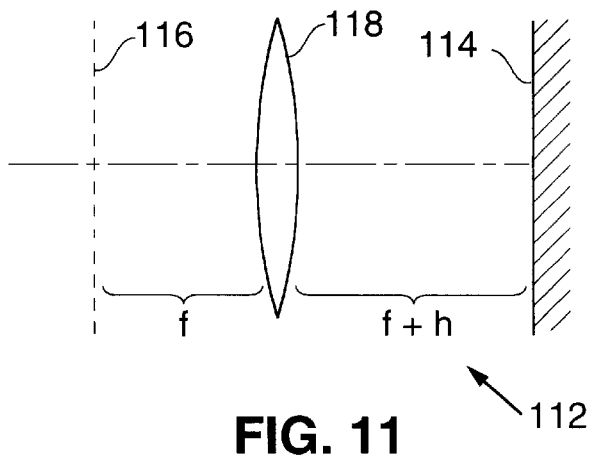
FIG. 11 schematically illustrates yet another hypothetical system of a spaced apart positive lens and plane mirror which system is derived from the system of FIG. 10.

FIG. 11 shows a system 112 which is, in effect, system 110 "folded" by a plane mirror 114. System 112 has a combined input and output plane 116 and only one lens 118 of focal length f, through which light passes twice. Accordingly, system 112 can be considered to be equivalent to a mirror at plane 116 having a radius of curvature R* given by an equation:

$$R^* = f^2/h \quad (3)$$

R*, of course, being variable with h.

Figure 12:
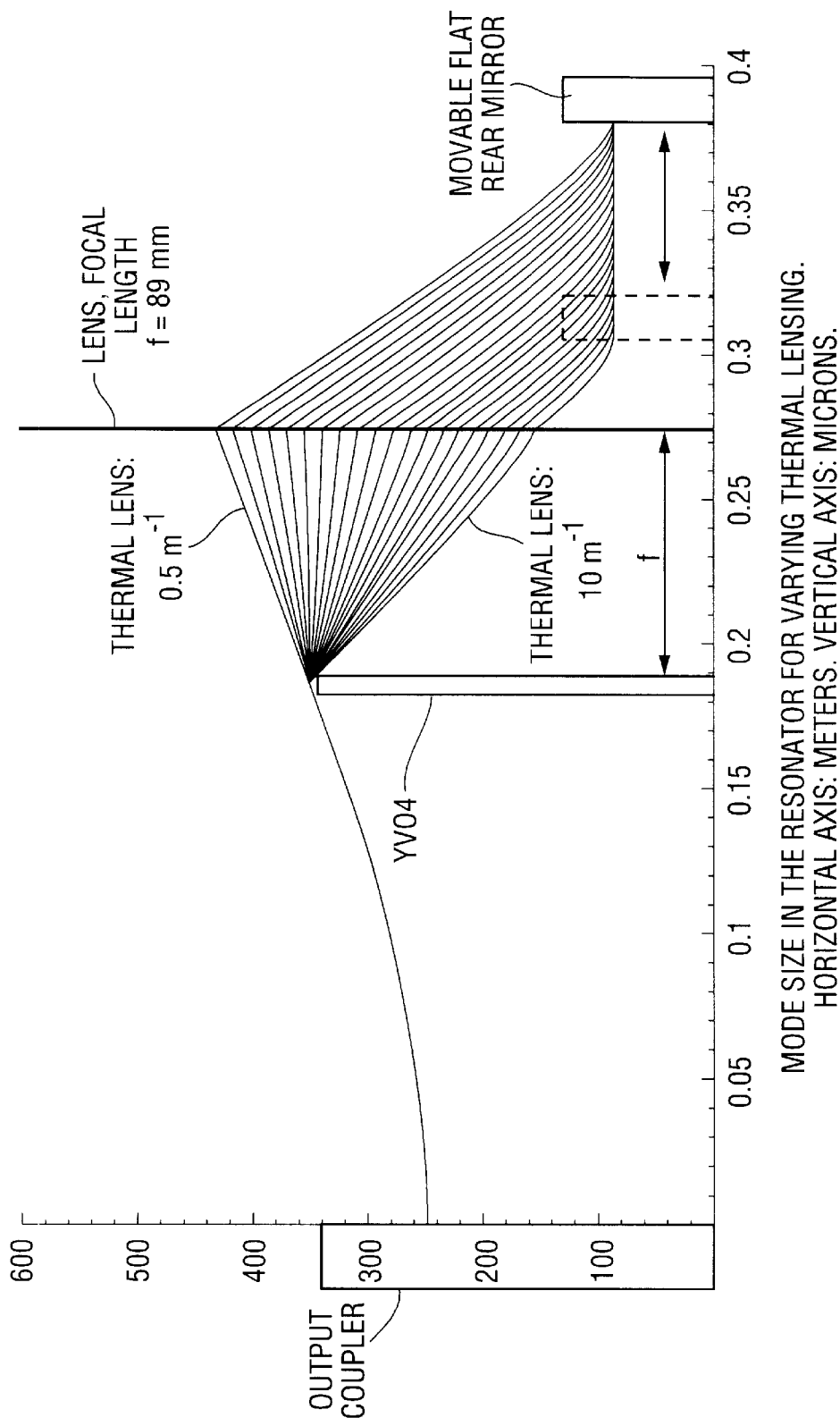
FIG. 12 schematically illustrates in combined graphical and pictorial form compensation for variation of mode-size in a resonator with thermal lensing in a gain rod using the lens/mirror system of FIG. 11.

FIG. 12 schematically illustrates, in combined pictorial and graphical form, calculated mode-size as a function of thermal lensing in a resonator including a YVO$_4$ gain-rod. The resonator is terminated at one end thereof by a fixed plane output coupling mirror and at the other end thereof by a movable plane mirror spaced apart from an intra-cavity positive lens of focal length 89 mm. Mode size at the positive lens is shown for YVO4 thermal lensing (dioptric) power in a series of values from 0.5 to 10.0 reciprocal meters (m$^{-1}$). By moving the movable mirror, as illustrated in FIG. 12, a constant spot size at the output coupling mirror is maintained.

Figure 13:
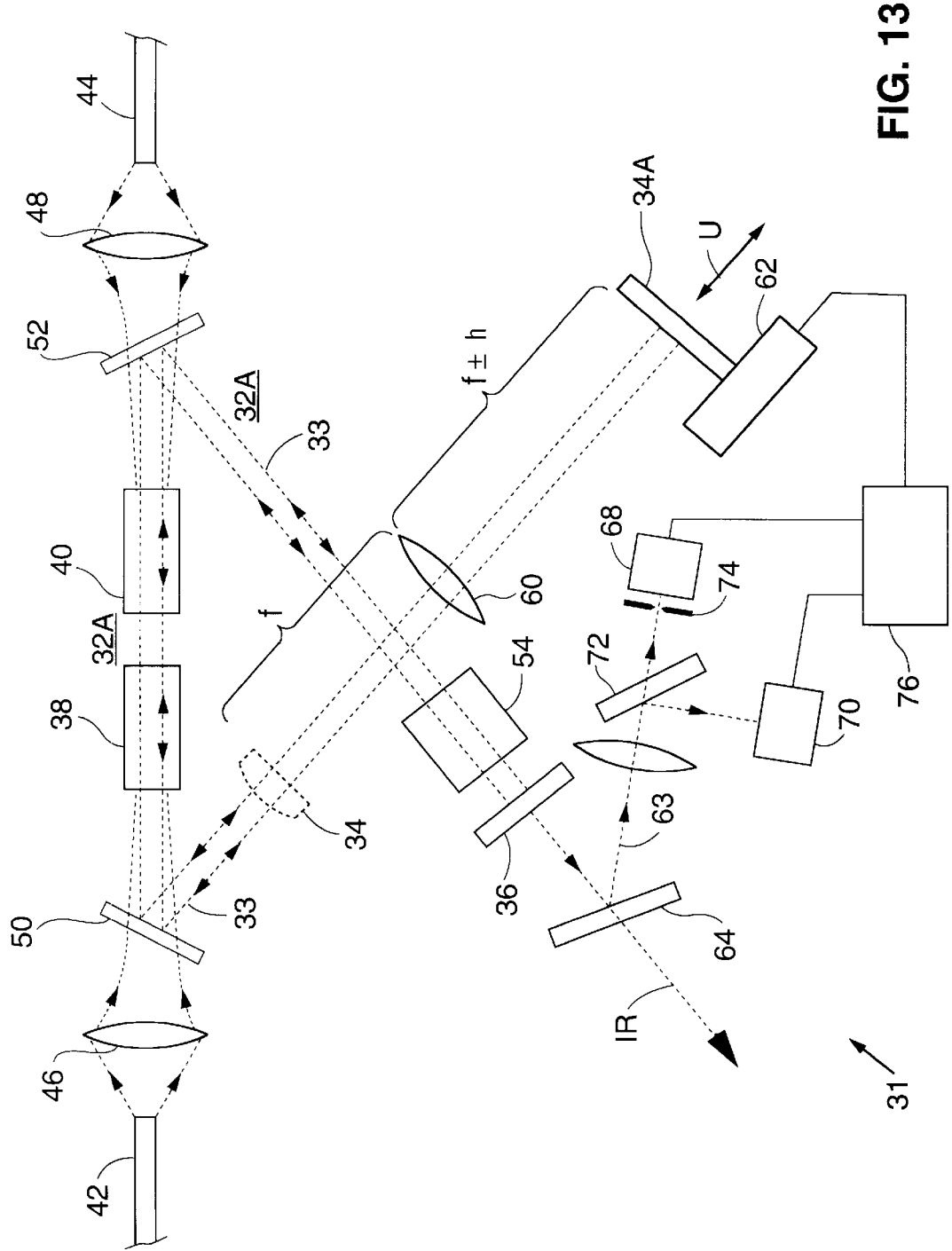
FIG. 13 schematically illustrates another preferred embodiment of a laser system in accordance with the present invention having a resonator including one preferred embodiment of active means for compensating for variations of thermal-lensing in gain-media.

Schematically illustrated in FIG. 13 is another preferred embodiment 31 of a laser system in accordance with the present invention, in which the above-described "variable-curvature mirror" principle is embodied. Laser system 31 includes a resonator 32A, which is similar to resonator 32 (see FIG. 1) with the exception that convex mirror 34 of resonator 32, the original position of which is indicated in phantom in FIG. 9, has been replaced with a folded optical relay arrangement 58. Relay arrangement 58 includes a positive lens 60 having a focal length f. Positive lens 60 is spaced by a distance f from the position at which fixed mirror 34 is located in resonator 32. A plane mirror 34A is spaced apart from lens 60 by a distance f±h. Mirror 34A in fact forms one end of resonant cavity 32A. Mirror 34A is mounted on a linear translation stage which allows h to be continuously varied, as indicated by arrows U.

When relay system 58 is located such that lens 60 thereof is at a distance f from the original position of mirror 34, the system provides the equivalent of a single mirror located at the original position of mirror 34 and having a radius of curvature given by equation (3) above. This means that the "equivalent single mirror" is variable in curvature from concave (when h>0) to convex (when h<0). In one example of relay system 58 (compatible with above described exemplary specifications of resonator 32), lens 60 has a focal length of about 8.9 cm, and f±h varies from about 3.0 cm to 8.0 cm between pumping extremes. This example, however, should not be considered as limiting.

In a resonator configuration of the type illustrated in FIG. 1, it is usual to select resonator mirrors and any anticipated thermal-lensing such that the laser beam spot (mode) size at the pumped-end of a gain-medium rod has a particular relationship to the size of the pump beam at the same position. The spot size at the pumped-end of the gain-medium rod stays essentially constant with changes in thermal-lensing. In the absence of any thermal-lensing compensation, the spot-size at output coupling mirror 36, however, varies monotonically and predictably with variations in thermal-lensing in gain-media through a desired spot-size. Accordingly, in system 31, by detecting changes in laser-beam spot-size, changes in thermal-lensing can be detected and then compensated, as discussed-above, by displacing mirror 34 in an appropriate direction.

In system 31, spot-size changes are detected by sampling a portion 63 of output beam (IR) using a partially reflecting mirror 64. A lens 66 re-images the diameter of resonating beam 33 at mirror 36 in a 1:1 ratio onto a photodiode 68 and, by means of a partially reflecting mirror 72, onto a photodiode 70. Mirror 72 is preferably about equally reflective and transmissive for laser light at fundamental frequency ω.

Photodiode 70 sees a full equivalent image which will vary in size with variations in thermal-lensing. Nevertheless, a signal produced by photodiode 70 represents the full power in that image. A pinhole aperture 74 is provided in front of photodiode 68 such that the portion of an image incident thereon is fixed. As the size of the equivalent image on the pinhole aperture increases or decreases, photodiode 68 will see a lesser or greater portion of power in the image. Accordingly, the ratio of signals provided by photodiodes 68 and 70 provide a measure of spot-size. Processing electronics 76 detect the ratio of signals generated by photodiodes 68 and 70 in response to the incident sampled beam. A nominal target ratio, predetermined by selection of pinhole aperture 74, represents a desired laser beam spot-size. An increase or decrease in that ratio is interpreted by processing electronics 76 as respectively a decrease and increase in dioptric power of thermal-lensing. Processing electronics 76 provide a signal to translation stage 62 to move mirror 34A respectively away from or toward lens 60 to compensate for the thermal-lensing change and restore the desired beam spot size.

A thermal lens compensation scheme in accordance with the present invention is not limited to the above-described combination of plane mirror and positive lens. It is also possible to provide compensation by means of a combination of a positive lens and a concave mirror. A description of one such arrangement is set forth below.

The basic design of the resonator is developed from a "hemiconfocal" or hemispherical resonator which, in basic form, includes a flat output coupler, a resonator length L and a curved rear mirror with radius of curvature 2 L. The spot size $W_0$ of the mode at the flat output coupler is such that the Rayleigh range is equal to L giving the relationship:

$$\pi W_0^2/\lambda = L \quad (5)$$

where λ is the lasing wavelength, and $W_0$ to a first order of approximation is stationary for small changes in resonator length L, that is:

$$\partial W/\partial L = 0 \quad (6)$$

In the above-described arrangement of a positive lens and plane mirror the translation of the of flat plane mirror placed behind a lens leads to an equivalent curved mirror placed at a fixed location with variable radius of curvature. In this second arrangement, a variable lens (here, the thermal lens of the laser material) placed behind a fixed lens leads to an equivalent flat mirror, the location of which changes linearly with changing dioptric power of the thermal lens, i.e., variations in thermal lensing of the gain medium.

Figure 14:
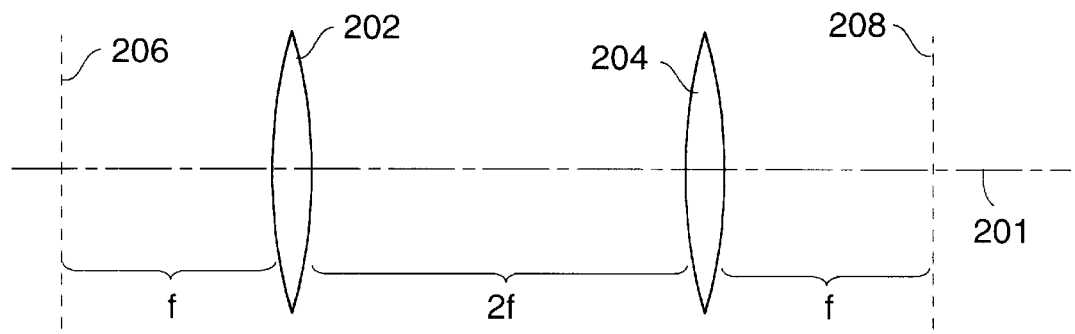
FIG. 14 schematically illustrates another hypothetical system of two spaced-apart spherical lenses from which system are derived active means in accordance with the present invention for compensating for variations of thermal-lensing in gain-media.

Referring now to FIG. 14, a hypothetical relay system 200 including two positive lenses 202 and 204, each of focal length f, and having an input plane 206 and an output plane 208 is illustrated. Lenses 202 and 204 are disposed an optical axis 201 separated from each other by a distance 2f, and separated from respectively the input and output planes by a distance f. The ABCD matrix for such system, going from input plane 206 to the output plane 208, is, simply:

$$\begin{bmatrix} -1 & 0 \\ 0 & -1 \end{bmatrix} \quad (7)$$

Figure 15:
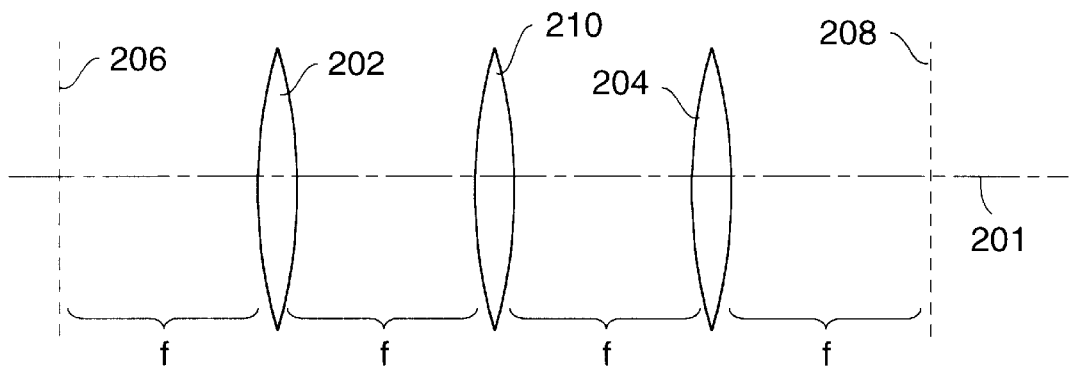
FIG. 15 schematically illustrates another hypothetical system of three spaced apart spherical lenses which system is a modification of the system of FIG. 14.

Referring now to FIG. 15 if a third lens 210 of variable focal length g is placed midway between the two lenses a system 212 is formed having an ABCD matrix, going from input plane 206 to the output plane 208, of:

$$\begin{bmatrix} -1 & -\dfrac{f^2}{g} \\ 0 & -1 \end{bmatrix} = -1 \begin{bmatrix} 1 & \dfrac{f^2}{g} \\ 0 & 1 \end{bmatrix} \quad (8)$$

System 212 is thus equivalent, apart from an inversion which is of no consequence in determining the resonator mode, to simple propagation, for a distance proportional to the dioptric power 1/g of the lens placed in the middle.

Figure 16:
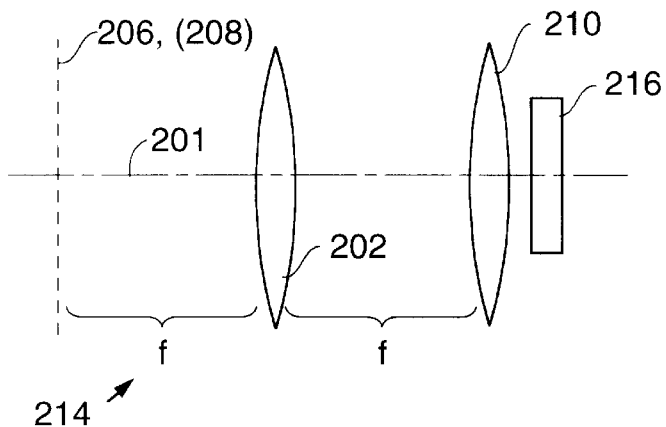
FIG. 16 schematically illustrates yet another hypothetical system of two spaced apart spherical lenses and a plane mirror which system is a modification of the system of FIG. 15.
Figure 17:
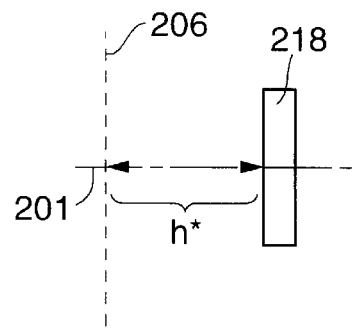
FIG. 17 schematically illustrates a plane mirror equivalent of the system of FIG. 16.

FIG. 16 depicts a "folded" system 214 equivalent to system 212. System 214 is formed by eliminating lens 204 of system 212 and placing a plane mirror immediately behind lens 210. The ABCD matrix for a ray that enters at input plane 206, reaches plane mirror 216 and goes back to output plane 208 coincident with plane 206, remains that which is given by equation (7), apart from the fact that the lens g is seen twice by the ray. The system of lenses 202, 210 and plane mirror 216 is thus equivalent to simple propagation for a (round trip) distance $2f^2/g$, or, in other words, to an "equivalent" plane mirror 218 placed at a distance $h^* = f^2/g$ from input plane 206, as illustrated in FIG. 17. The location h* of the equivalent mirror is positive (behind the input plane) for a converging lens (g>0 as illustrated in FIG. 17), and is negative (in front of the input plane) for a diverging lens (g<0).

Figure 18:
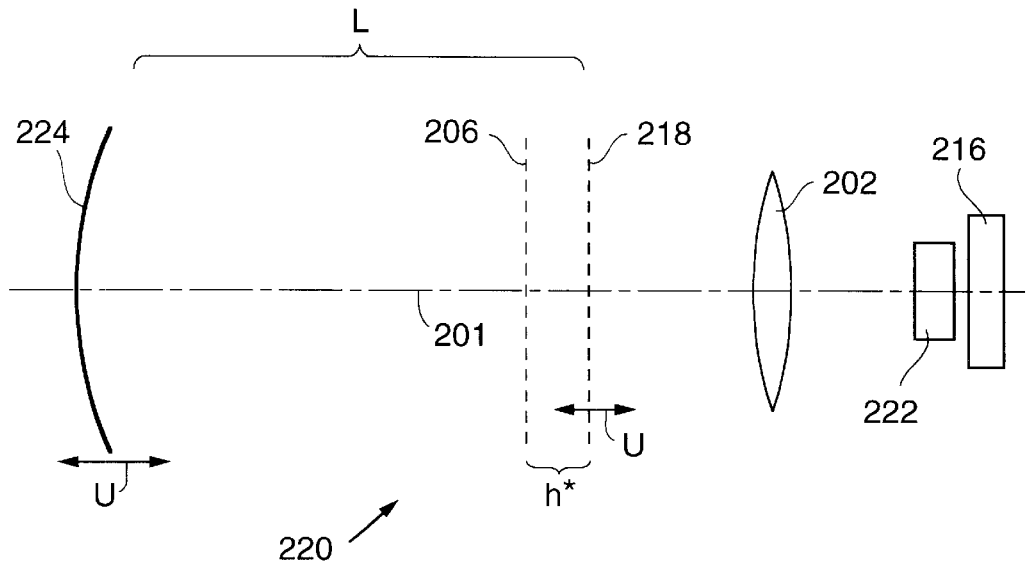
FIG. 18 schematically illustrates a hypothetical hemiconfocal resonator in accordance with the present invention having a fixed lens therein, a concave mirror movable with respect to the fixed lens and a plane mirror.

Referring now to FIG. 18, lens 210 of variable focal length g is substituted in a simple resonator 220 by a laser crystal (gain medium) 220 that exhibits varying amounts of thermal lensing (varying dioptric power $1/f_{thermal}$) in response to varying amounts of pump power. With the proposed scheme, the varying dioptric power is translated into varying positions of an equivalent flat mirror indicated in FIG. 18 by dashed line 218.

In terms of an equivalent hemiconfocal resonator configuration, line 218 represents a plane mirror which moves axially with varying thermal lensing as indicated by arrows U. The concave mirror, represented in FIG. 18 by concave mirror 224 must be moved correspondingly to maintain the resonator length L constant, thereby compensating for the thermal lensing changes. As the resonator length is maintained constant, so the spot size at the concave mirror is maintained constant.

Figure 19:
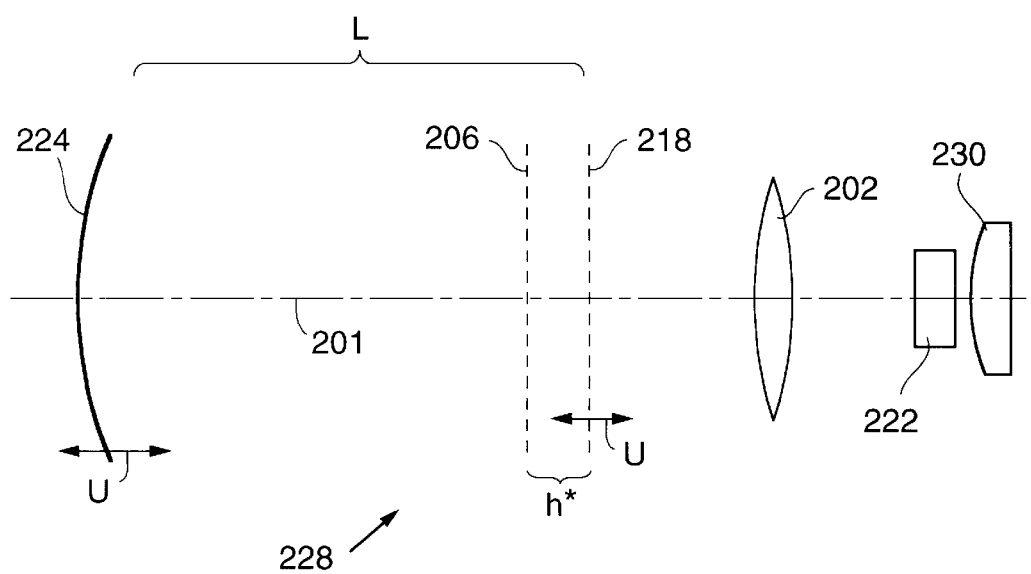
FIG. 19 schematically illustrates another hypothetical hemiconfocal resonator in accordance with the present invention having a fixed lens therein, a concave mirror movable with respect to the fixed lens and a convex mirror for pre-compensating for thermal lensing.

Referring now to FIG. 19, a resonator arrangement 228 is shown which is essentially the resonator arrangement of FIG. 18, wherein a convex (negative power) mirror 230 has been substituted for plane mirror 216. Such a substitution may be made achieve a degree of fixed pre-compensation for thermal lensing, the fixed negative dioptric power of the mirror adding to the variable positive dioptric power of the gain medium 222. The position 218 of the equivalent flat mirror is determined by the total dioptric power of convex mirror plus the gain medium. It should be noted here that the resonator configuration 220 of FIG. 18 could also be adapted to accommodate (pre-compensate) for stronger thermal lensing by providing a concave surface on one or both ends of gain medium 222.

Simple considerations show that the spot size in the laser crystal Wr is related to the spot size at the location of the equivalent flat mirror $W_0$ by a relationship:

$$f = \partial W_r W_0 / \lambda \tag{9}$$

Once the spot size in the gain medium and the focal length of lens 202 are chosen, the spot size $W_0$ remains determined. The equivalent length L of the resonator (from rear mirror to equivalent flat mirror) required to achieve the desired $W_0$ is then given by equation (5). The radius of curvature of the rear mirror is then chosen as 2 L.

It will be evident to one skilled in the art from discussion of equation (6) above, that the spot size at the gain medium is to first order independent of the thermal lensing in the gain medium. Small changes in the thermal dioptric power lead to small changes in the equivalent flat mirror position 218, and the provision of equation (6) ensures that the spot size at the equivalent flat mirror stays stationary.

Figure 20:
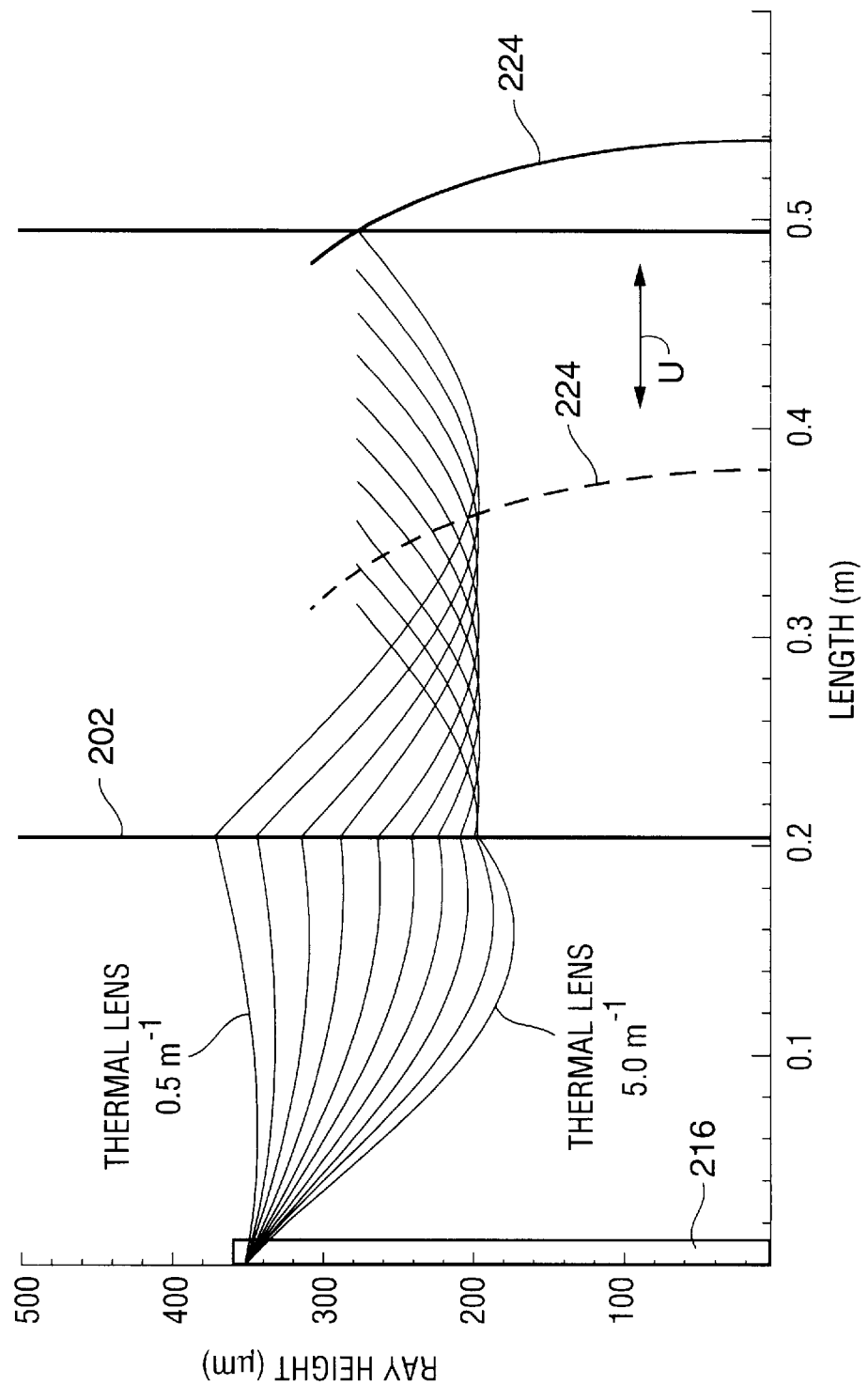
FIG. 20 schematically illustrates in combined graphical and pictorial form compensation for variation of mode-size in a resonator with thermal lensing in a gain rod in the hypothetical resonator of FIG. 18.

FIG. 20 schematically depicts computed mode size (ray height) inside a resonator 220 of FIG. 18 for a number of different values of the thermal lensing in gain medium 222 ranging from 0.5 $m^{-1}$ to 5.0 $m^{-1}$. Gain medium 222 is assumed to be $YVO_4$, mirror 224 is assumed to have a radius of 22 cm, mirror 218 is flat, and lens 202 (indicted by a single line) is assumed to have a focal length of 20 cm.

For each value of thermal lensing, the position of concave mirror 224 is adjusted, as indicated by arrows U, such that the ray height thereon is constant, to achieve the required thermal lens compensation. As a consequence, the spot size at gain medium 222 laser crystal remains constant.

Figure 21:
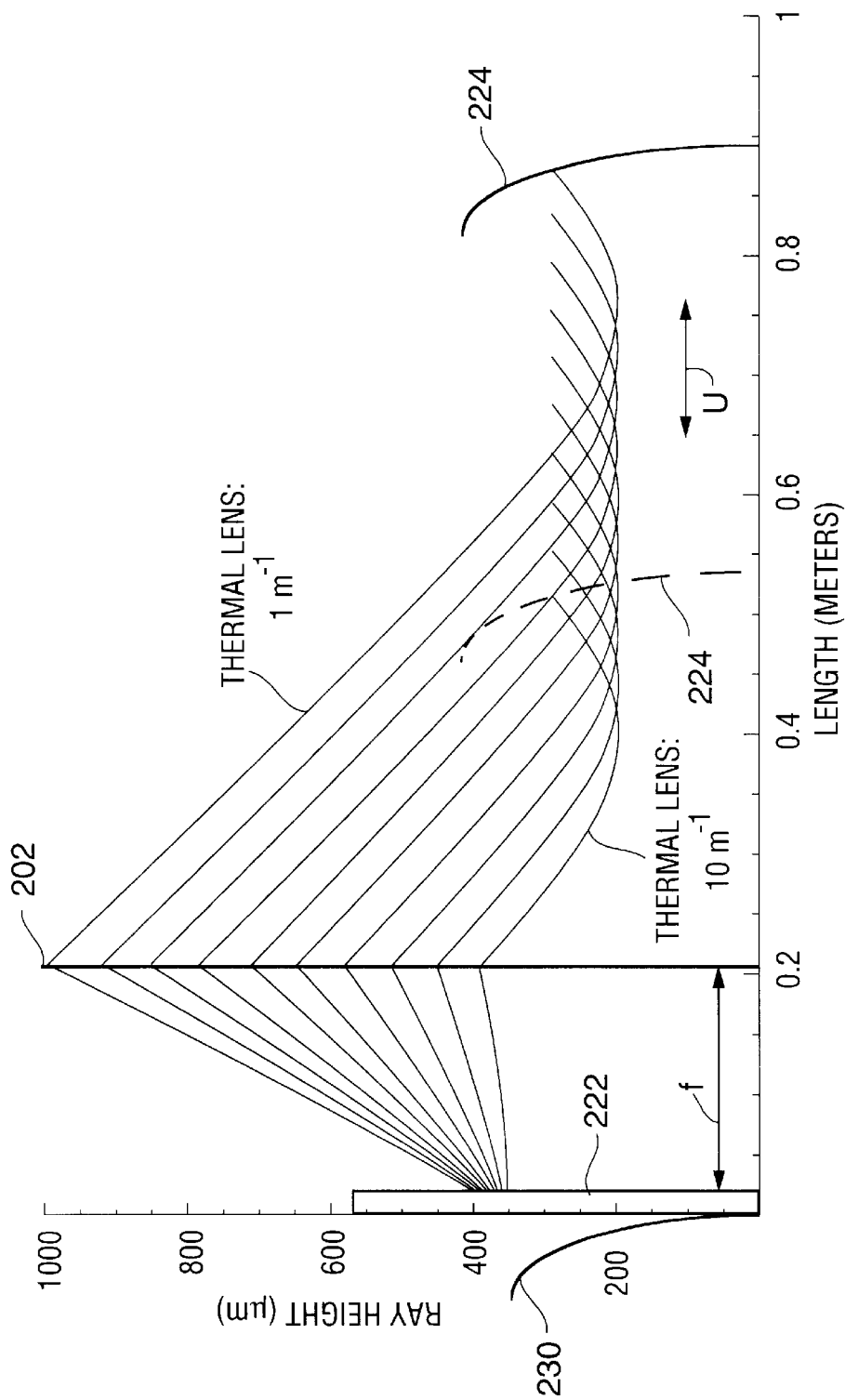
FIG. 21 schematically illustrates in combined graphical and pictorial form compensation for variation of mode-size in a resonator with thermal lensing in a gain rod in the hypothetical resonator of FIG. 19.

FIG. 21, schematically depicts computed mode size (ray height) inside a resonator 228 of FIG. 19 for a number of different values of the thermal lensing in gain medium 222 ranging from 1.0 $m^{-1}$ to 10.0 $m^{-1}$. Gain medium 222 is assumed to be $YVO_4$, mirror 224 is assumed to have a radius of 22 cm, mirror 230 is assumed to have a radius of 10 cm, and lens 202 (indicated by a single line) is assumed to have a focal length of 20 cm.

Figure 22:
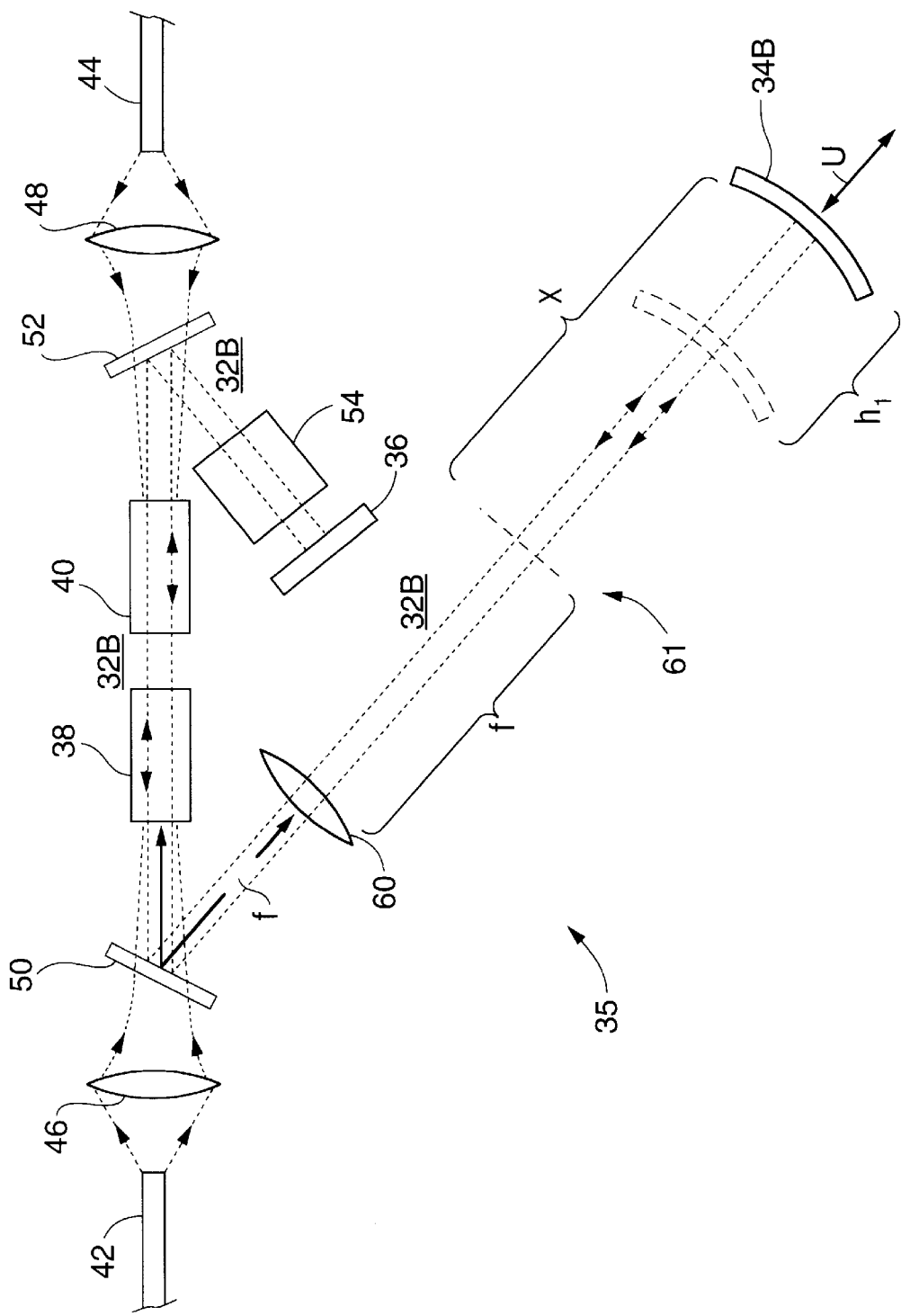
FIG. 22 schematically illustrates yet another preferred embodiment of a laser system in accordance with the present invention having a resonator derived from the hypothetical resonator of FIG. 19 including another preferred embodiment of active means for compensating for variations of thermal-lensing in gain-media.

Referring now to FIG. 22, another preferred embodiment 35 of a laser system in accordance with the present invention, derived from the resonator arrangement of FIG. 18 for compensating for thermal-lensing variations in gain-media, is illustrated. System 35 includes a resonator 32B which is similar to resonator 32 of FIG. 1, with the exception that concave mirror 34 of resonator 32 has been replaced with a system 61 including a positive lens 60 and a concave mirror 34B. Output coupling plane-mirror 36 has been moved as close as possible to rod 40 as fold mirror 52 and Q-switch 54 permit. Lens 60 of optical system 61 is located a (folded path) distance of about one focal length (f) of the lens from gain-rod 38. Spacing between concave mirror 34B and lens 60 is variable, as indicated by arrows U. Concave mirror 34B of optical system 61 is located, for any given mode of operation of resonator 32B, at a distance f+X−h* from lens 60, where h* is a variable $\geq 0$, and X is one half of the radius of curvature of concave mirror 34B. If, at any instant in the operation of resonator 32B, thermal-lensing due to gain-media (rods) 38 and 40 provides a combined dioptric-power equal to $1/f_{thermal}$ (where $f_{thermal}$ is the equivalent focal length of the gain-media considered as a single lens), distance h* is given by:

$$h^* = f^2 / f_{thermal} \tag{10}$$

where $f^2/f_{thermal}$ is equivalent the distance $f^2/g$ discussed above. From equation (10) it can be seen that distance X, and, accordingly, the radius of curvature of mirror 34B, is preferably selected to correspond to at least the maximum thermal-lensing anticipated in operation of resonator 32B. By way of example, if lens 60 has a focal length of 10.0 cm and a maximum value of $f_{thermal}$ of about 10.0 cm is anticipated then mirror 34B preferably has a radius of curvature of about 20 cm.

In any event, as focal length f is known, and $f_{thermal}$ is initially predictable and at any instant can be determined as described above from a determination of laser beam spot-size, determination of a suitable initial resonator and gain medium specifications, and subsequent determinations of h* required to compensate for changes in thermal-lensing are relatively straightforward.

It should be noted, however, that while the thermal-lensing compensation arrangement of optical system 61 may in theory be as effective in compensating for thermal-lensing variations as optical system 58 of FIG. 13, optical system 61 requires that precise alignment of mirror 34B be maintained during translation, and, because of this, is the more difficult to implement in practice. Further, it may be difficult in practice to bring rods 38 and 40 sufficiently close to output coupling mirror 36 to properly replicate the "ideal" or hypothetical resonator configuration of FIG. 18.

Figure 23:
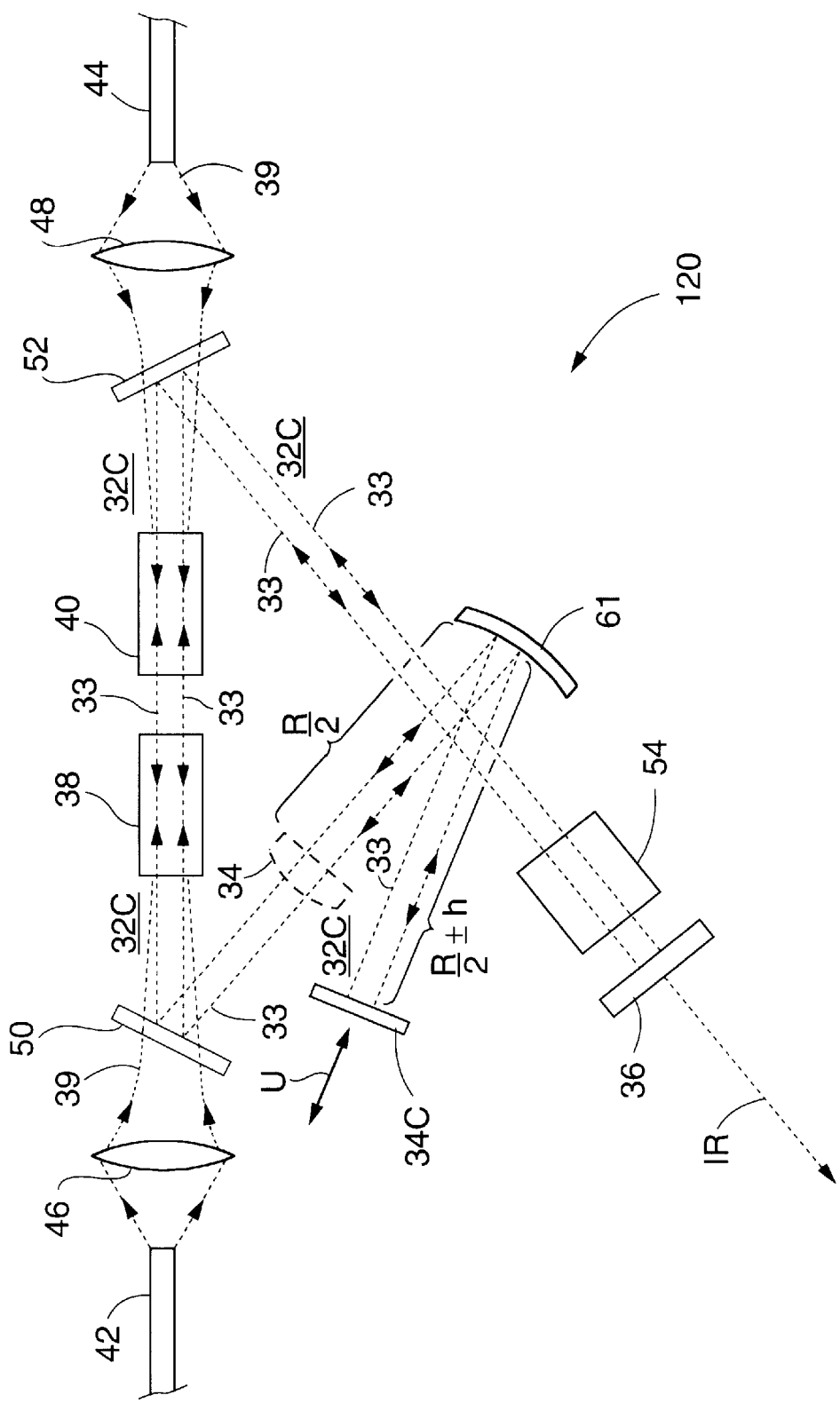
FIG. 23 schematically illustrates still another preferred embodiment of a laser system in accordance with the present invention having a resonator including yet another preferred embodiment of active means for compensating for variations of thermal-lensing in gain-media.

Referring now to FIG. 23, yet another preferred embodiment 120 of a laser system in accordance with the present invention, including means for compensating for thermal-lensing variations in gain-media, is illustrated. System 120 is similar to system 35 of FIG. 13, with the exception that lens 60 thereof has been replaced by a concave mirror 61 having a radius of curvature R. Concave mirror 61 is located at a distance R/2 (the focal length of the mirror) from the original position of mirror 34 in resonator 32 of FIG. 1. Plane mirror 34C is located at a distance R/2±h from mirror 61. Resonator 32C, terminated by mirrors 36 and 34C of system 120, is additionally folded by mirror 61 when compared with resonator 32A of FIG. 13. Lens 61 and mirror 34C together may be considered as equivalent to a variable mirror having radius of curvature R* given by:

$$R^* = R^2/4h \tag{11}$$

which, of course, derives directly from equation (3).

Those skilled in the art to which the present invention pertains will recognize that in system 35 of FIG. 15, a concave mirror may also be substituted for lens 60, with additional folding of the system. This would result, however, to a resonator occupying a much longer overall physical space unless a more complex folding scheme was employed.

It should further be noted that while above-described thermal-lensing compensation arrangements have been described in the context of a laser system in accordance with the present invention including two or more different gain-media, the compensation arrangements are equally applicable to resonators including only one gain-medium, two or more rods of the same gain-medium and any mode of laser operation, continuous or pulsed, in which thermal-lensing in a gain-medium may limit operational flexibility of the laser.

Thermal-lensing contributions in a resonator are usually greatest from gain-media, as pump-radiation is usually concentrated in such media and these media must absorb pump-radiation in order to energize the media for resonator operation. Materials generally regarded as being strong thermal lensing materials include but are not limited to a group consisting of Nd:YAG, Nd:YVO$_4$, Nd:GVO$_4$, Nd:YPO$_4$, Nd:BEL, Nd:YALO and Nd:LSB. Principles of the present invention are applicable, however, should thermal-lensing effects be contributed by optical components included in a resonant cavity, other than gain-media. Such elements include but are not limited to, Q-switches, dichroic mirrors, and polarizing elements.

The present invention has been described and depicted in terms of a preferred and other embodiments. The application is not limited, however, to those embodiments described and depicted. Rather, the application is defined by the claims appended hereto.

What is claimed is:

1. A laser comprising:
    first and second mirrors forming a laser resonant cavity;
    a solid-state gain medium located in said resonant cavity, said gain medium contributing to thermal-lensing effects in said resonant cavity during operation thereof, said thermal-lensing effects varying with variations of one or more operating parameters of said resonant cavity;
    an optical component having positive optical power, said optical component being located in said resonant cavity at a fixed distance from said gain medium and being spaced apart from said first mirror to form a folded optical relay therewith, said folded optical relay having an input plane located in said resonant cavity between said optical component and said gain medium; and
    wherein location of said first mirror is variable for varying spacing between said optical component and said first mirror for compensating for said variations in thermal-lensing effects.

2. The laser of claim 1, wherein said first mirror is a plane mirror.

3. The laser of claim 2 wherein said optical component is a lens.

4. The laser of claim 2 wherein said optical component is a third mirror.

5. The laser of claim 1, wherein said first mirror is a concave mirror.

6. The laser of claim 5 wherein said optical component is a lens.

7. The laser of claim 6 wherein said optical component is a third mirror.

8. The laser of claim 1, further including means for detecting said variations in thermal-lensing effects, and means cooperative therewith for varying said spacing between said optical component and said first mirror in accordance with detected variations in thermal-lensing effect.

9. The laser of claim 8, wherein said means for detecting said variations in thermal-lensing effects includes means for detecting a selected parameter of laser-radiation generated during operation said resonant cavity, and interpreting variations in said detected parameter as a measure of variations in thermal-lensing effects.

10. The laser of claim 9 wherein said selected parameter is spot-size of a beam of said laser-radiation at a selected location on the beam.

11. The laser of claim 10, wherein said second mirror is an output mirror of said laser cavity and said selected location is on said second mirror.

12. The laser of claim 1 wherein said first optical component is a rod of a solid-state gain-medium.

13. The laser of claim 12 wherein said solid-state gain-medium is a strong thermal-lensing material selected from a group of strong thermal-lensing materials consisting of Nd:YAG, Nd:YVO$_4$, Nd:GVO$_4$, Nd:YPO$_4$, Nd:BEL, Nd:YALO and Nd:LSB.

14. The laser of claim 1 wherein said first mirror is a concave mirror and said second mirror is a plane mirror.

15. The laser of claim 1 wherein said first mirror is a concave mirror and said second mirror is a convex mirror.

16. A laser comprising:
    first and second mirrors forming a laser resonant cavity;
    a solid-state gain medium located in said resonant cavity, said gain medium contributing to thermal-lensing effects in said resonant cavity during operation thereof, said thermal-lensing effects varying with variations of one or more operating parameters of said resonant cavity;
    an optical component having positive optical power, said optical component being located in said resonant cavity at a fixed distance from said gain medium and being spaced apart from said first mirror to form a folded optical relay therewith, said folded optical relay having an input plane located in said resonant cavity between said optical component and said gain medium, and the location of said first mirror being variable; and
    means for detecting said variations in thermal-lensing effects, and means cooperative therewith for varying said location of said first mirror for compensating for said detected variations in thermal-lensing effects.

17. The laser of claim 16, wherein said means for detecting said variations in thermal-lensing effects includes means for detecting a selected parameter of laser-radiation generated during operation said resonant cavity, and interpreting variations in said detected parameter as a measure of variations in thermal-lensing effects.

18. The laser of claim 17 wherein said selected laser-radiation parameter is spot-size of a beam of said laser-radiation at a selected location on the beam.

19. The laser of claim 18, wherein said second mirror is an output mirror of said laser cavity and said selected location is on said second mirror.

20. The laser of claim 16, wherein said first mirror is a plane mirror.

21. The laser of claim 20, wnerein said second optical component is a lens.

22. The laser of claim 20, wherein said optical component is a third mirror.

23. The laser of claim 16, wherein said first mirror is a concave mirror.

24. The laser of claim 23, wherein said optical component is a lens.

25. The laser of claim 23, wherein said optical component is a third mirror.

26. The laser of claim 16, wherein said first mirror is a concave mirror and said second mirror is a plane mirror.

27. The laser of claim 16, wherein said first mirror is a concave mirror and said first mirror is a convex mirror.

28. A laser comprising:
    first and second mirrors forming a laser resonant cavity;
    at least one rod of a solid-state gain-mediium disposed in said resonant cavity, said solid-state gain-medium rod contributing to thermal-lensing effects in said resonant cavity during operation thereof, said thermal-lensing effects varying with variations of one or more operating parameters of said resonant cavity;
    a lens having positive dioptric power disposed in said optical cavity and spaced apart from said first mirror, said first mirror being variable in position and said first mirror being variable in position for varying spacing therebetween;

means for detecting spot-size variations of a beam of laser radiation generated in said resonant cavity during operation thereof and interpreting said spot-size variations as said variations in thermal-lensing effects; and means cooperative with said spot-size variation detecting means for varying said position of said first mirror for compensating for said variations in thermal-lensing effects.

29. The laser of claim 28, wherein said solid-state gain-medium is a strong thermal-lensing material selected from a group of strong thermal-lensing materials consisting of Nd:YAG, Nd:YVO$_4$, Nd:GVO$_4$, Nd:YPO$_4$, Nd:BEL, Nd:YALO and Nd:LSB.

30. A laser comprising:

first an second mirrors forming a laser resonant cavity;

at least one rod of a solid-state gain-medium desposed in said resonant cavity, said solid-state gain-meduim rod contributing to thermal-lensing effects in said resonant cavity during operation thereof, said thermal-lensing effects varying with variations of one or more operating parameters of said resonant cavity;

a third mirror having positive catoptric power disposed in said optical cavity and spaced apart from said first mirror, said third mirror being in a fixed position and said first mirror being variable in position for varying spacing therebetween;

means for detecting spot-size variations of a beam of laser radiation generated in said resonant cavity during operation thereof and interpreting said spot-size variations as said variations in thermal-lensing effects; and means cooperative with said spot-size variation detecting means for varying said spacing between said lens and said first mirror for compensating for said variations in thermal-lensing effects.

31. The laser of claim 30, wherein said solid-state gain-medium is a strong thermal-lensing material selected from a group of strong thermal-lensing materials consisting of Nd:YAG, Nd:YVO$_4$, Nd:GVO$_4$, Nd:YPO$_4$, Nd:BEL, Nd:YALO and Nd:LSB.

32. Laser apparatus comprising:

a laser resonator including a gain medium which provides a thermal-lens effect during operation of the resonator, a laser beam generated in said laser resonator having a mode size at a particular position in said laser resonator, said mode-size having an optimum value when optical elements of said laser resonator are arranged to compensate for said thermal-lens effect;

an arrangement for detecting a variation in said mode size from said optimum value resulting from a variation in said thermal-lens effect, and for generating from said detected mode size variation a signal representative thereof; and said laser resonator including an optical element moveable in response to said mode-size variation signal for restoring said mode size to said optimum value, thereby compensating for said variation in said thermal-lens effect.

33. The apparatus of claim 32 wherein said movable optical element is an end mirror of said laser resonator.

34. The apparatus of claim 32 wherein said laser resonator is terminated at one end thereof by a maximum reflecting mirror and at an opposite end thereof by an output coupling mirror, said moveable optical element being said maximum reflecting mirror and said mode size being the mode size at said output coupling mirror.

35. The apparatus of claim 32 wherein said mode size variation detecting arrangement includes first and second detectors and an optical arrangement for taking a sample of a laser beam generated by said laser resonator; said first detector being arranged to detect a first fraction of said laser beam sample, said first fraction of said laser beam sample varying according to said variation in said mode size, and said second detector being arranged to detect a second fraction of said laser beam sample, said second fraction of said laser beam sample being independent of said variation in said mode size; and said mode size variation signal being determined from said detected first and second fractions of said laser beam sample.

* * * * *